(12) United States Patent
Skurkis et al.

(10) Patent No.: US 10,697,512 B2
(45) Date of Patent: Jun. 30, 2020

(54) ARTICULATED SHIELD FOR A VEHICLE FRICTION BRAKE

(71) Applicant: GM Global Technology Operations LLC, Detroit, MI (US)

(72) Inventors: Richard J. Skurkis, Lake Orion, MI (US); Paul W. Alexander, Ypsilanti, MI (US); Anthony L. Smith, Troy, MI (US); David Begleiter, Toronto (CA); Mark T. Riefe, Brighton, MI (US); Steven J. Weber, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 164 days.

(21) Appl. No.: 15/987,010

(22) Filed: May 23, 2018

(65) Prior Publication Data

US 2019/0360543 A1  Nov. 28, 2019

(51) Int. Cl.
*F16D 65/78* (2006.01)

(52) U.S. Cl.
CPC ........ *F16D 65/78* (2013.01); *B60Y 2410/136* (2013.01); *F16D 2065/783* (2013.01)

(58) Field of Classification Search
CPC .... F16D 65/18; F16D 65/78; F16D 2065/783; F16D 2065/781; F16D 65/847; B60T 5/00; B60Y 2410/136
USPC .... 188/264 A, 264 AA, 264 R, 218 A, 71.6; 180/68.1–68.3; 280/727, 855
See application file for complete search history.

(56) References Cited

U.S. PATENT DOCUMENTS

| | | | | |
|---|---|---|---|---|
| 4,810,021 A * | 3/1989 | Burst | ........................ | B60T 5/00 296/180.1 |
| 7,198,139 B2 * | 4/2007 | Wilson | .................... | F16D 65/78 188/264 AA |
| 7,600,615 B2 * | 10/2009 | Ramsay | .................... | B60T 5/00 188/264 AA |
| 8,474,557 B2 * | 7/2013 | Wolf | ........................ | B60T 5/00 180/68.2 |
| 9,004,241 B2 * | 4/2015 | Browne | .................... | B60T 5/00 188/264 A |
| 9,797,463 B1 * | 10/2017 | Skurkis | ................. | F16D 65/847 |
| 10,364,909 B2 * | 7/2019 | Skurkis | ................. | F16K 31/002 |
| 2016/0025164 A1 * | 1/2016 | Watarai | .................. | F16D 65/12 188/218 XL |

* cited by examiner

*Primary Examiner* — Pamela Rodriguez
(74) *Attorney, Agent, or Firm* — Quinn IP Law (57) ABSTRACT

A shield assembly is employed for a friction brake used to decelerate a road wheel of a vehicle. The vehicle has a body with a first body end configured to face an incident ambient airflow, a second body end opposite of the first body end, and an underbody section spanning a distance between the first and second ends. The shield assembly includes a first shield component arranged proximate the brake and rotationally fixed relative to the vehicle body. The shield assembly also includes a second shield component operatively connected to the first shield component for shifting relative thereto. The shield assembly additionally includes an actuator employing a shape memory alloy element to shift the second shield component relative to the first shield component in response to a temperature of the brake to thereby direct at least a portion of the airflow to the brake and control temperature thereof.

8 Claims, 11 Drawing Sheets

ARTICULATED SHIELD FOR A VEHICLE FRICTION BRAKE

INTRODUCTION

The disclosure relates to an articulated shield for controlling airflow to a vehicle friction brake.

A brake is typically a mechanical device designed to inhibit motion. Brakes commonly use friction to convert kinetic energy into heat, though other methods of energy conversion may be employed. For example regenerative braking converts much of the kinetic energy to electric energy, which may be stored for later use.

On vehicles, braking systems are employed to apply a retarding force, typically via frictional elements at the vehicle's rotating axles or wheels, to inhibit vehicle motion. Friction brakes often include stationary shoes or pads that are lined with friction material and configured to be engaged with a rotating wear surface, such as a rotor or a drum. Common configurations include shoes that contact to rub on the outside of a rotating drum, commonly called a "band brake", a rotating drum with shoes that expand to rub the inside of a drum, commonly called a "drum brake", and pads that pinch a rotating disc, commonly called a "disc brake".

Modern vehicles typically use a hydraulic force to press the aforementioned shoes or pads against the respective rotating disc or drum, which slows the disc or drum and its attendant wheel. Generally, vehicle friction brakes absorb thermal energy and store the energy mainly in the brake disc or brake drum while the brakes are being applied, and then gradually transfer the stored heat to the ambient. Accordingly, during extended brake applications, such as when vehicle motion is retarded from elevated speeds, the drums or rotors, as well as respective shoes or pads, may experience extensive accumulation of heat.

SUMMARY

An articulated shield assembly is disclosed for a friction brake configured to decelerate a road wheel of a vehicle. The subject vehicle has a vehicle body including a first vehicle body end configured to face an incident ambient airflow, a second vehicle body end opposite of the first vehicle body end, and a vehicle underbody section configured to span a distance between the first and second vehicle body ends. The shield assembly includes a first shield component arranged proximate the friction brake and rotationally fixed relative to the vehicle body. The shield assembly also includes a second shield component operatively connected to the first shield component and configured to shift relative to the first shield component. The shield assembly additionally includes an actuator employing a shape memory alloy (SMA) element to shift the second shield component relative to the first shield component in response to a temperature of the friction brake to thereby direct at least a portion of the incident ambient airflow to the friction brake and control temperature thereof.

The actuator may additionally include a spring configured to counter a force generated by the SMA element and retract the second shield component below a preset temperature of the friction brake.

The first shield component may define an opening for the at least a portion of the incident ambient airflow, and the second shield component may be configured to rotate relative to the first shield component to thereby selectively block and unblock the opening.

The actuator may be arranged directly on the first shield component.

The opening defined by the first shield component may be a plurality of individual openings; the SMA element may be configured as a plurality of individual SMA wires; the spring may be configured as a plurality of individual springs; the first shield component may include a plurality of pivot members; and the second shield component may include a plurality of individual flaps. In such an embodiment, each individual SMA wire may be configured to rotate at least one of the plurality of individual flaps about a respective one of the plurality of pivot members and thereby selectively block and unblock a respective one of the plurality of individual openings.

The second shield component may be arranged proximate and parallel to the first shield component, while the second shield component may be configured to selectively space apart, i.e., shift away, from the first shield component to thereby generate a path for the at least a portion of the incident ambient airflow to the friction brake.

The shield assembly may additionally include a guide pin configured to maintain rotational position of the second shield component relative to the first shield component.

Each of the SMA element and the spring may be arranged concentrically around the guide pin.

The first shield component may define an opening, while the second shield component may be an elastic member configured to selectively cover and uncover the opening and generate a return force when flexed. In such an embodiment, the SMA element may be configured to flex the elastic member and thereby uncover the opening.

At least one of the first shield component and the second shield component may include a plurality of elastic members. In such an embodiment, the SMA element may be a spiral member wound around and configured to selectively squeeze the plurality of elastic members and thereby separate the second shield component from the first shield component.

A vehicle having such an articulated shield assembly is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
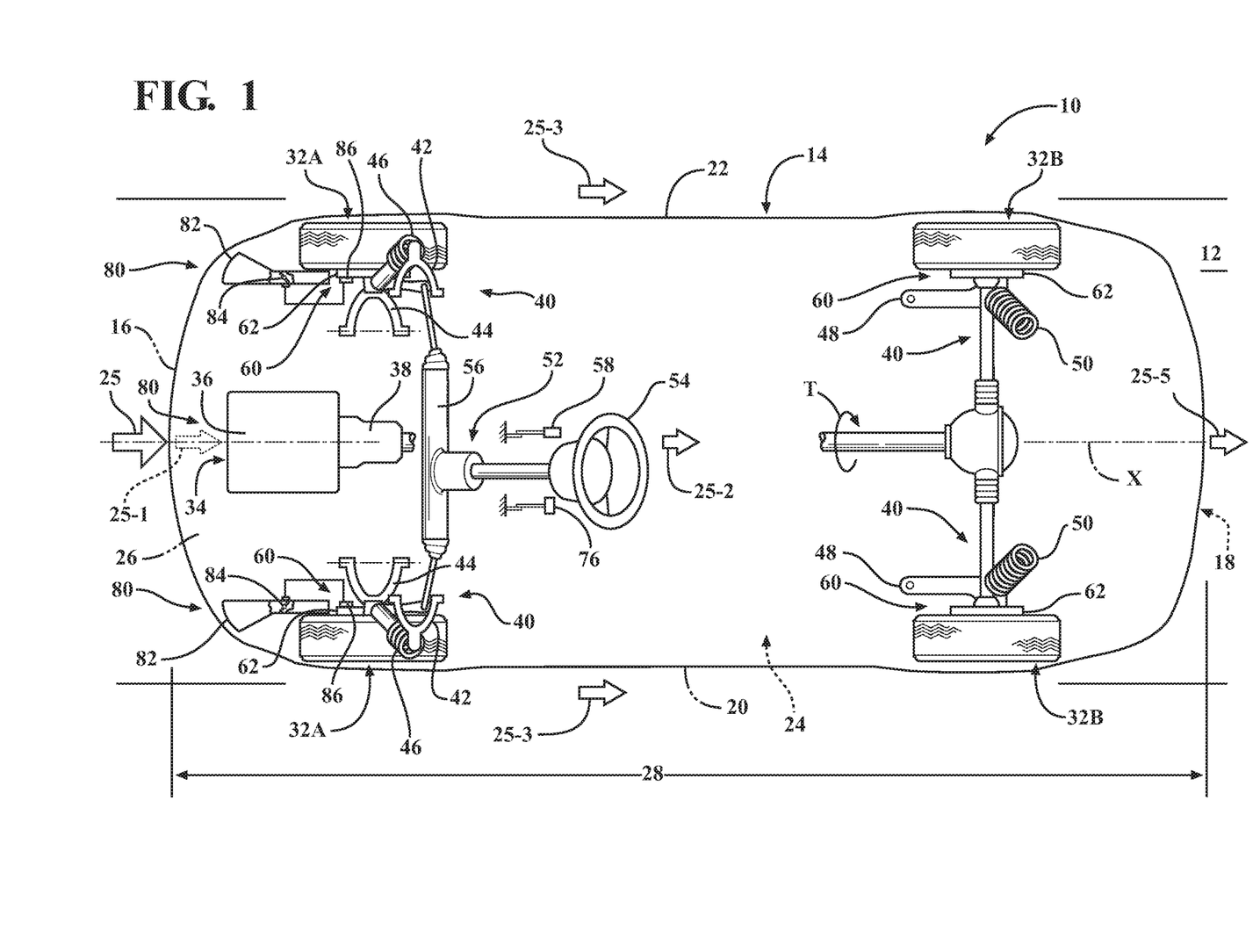
FIG. 1 is a schematic plan view of a motor vehicle having a friction brake subassembly at each road wheel and an articulated shield assembly with an actuator employing a shape memory alloy (SMA) element for operating the respective shield to direct an incident airflow to the specific brake subassembly according to the disclosure.

Referring to the drawings, wherein like reference numbers refer to like components, FIG. 1 shows a schematic view of a motor vehicle 10 positioned relative to a road surface 12. The vehicle 10 could be a mobile platform, such as a passenger vehicle, an ATV, an airplane, etc., used for personal, commercial, or industrial purpose.

As shown, the vehicle 10 includes a vehicle body 14 having a longitudinal axis X. The vehicle body 14 defines six body sides. The six body sides include a first body end or front end 16, an opposing second body end or rear end 18, a left side 20, a right side 22, and a top body section 24, which frequently includes a vehicle roof, and an underbody section 26 (shown in FIG. 3). As shown in FIG. 1, the front end 16 is configured to face oncoming or incident, i.e., approaching and contacting, ambient airflow 25, for example when the vehicle is in forward motion relative to the road surface 12.

With continued reference to FIG. 1, the underbody section 26 is configured to span a distance 28 between the front and rear ends 16, 18 of the body 14. The underbody section 26 also defines an unoccupied space between the vehicle body 14 and the road surface 12 (not shown). Accordingly, the space between the vehicle body 14 and the road surface 12 permits a first or underbody airflow portion 25-1 to pass under the vehicle body 14, between the vehicle body 14 and the road surface 12, while a second airflow portion 25-2 passes over the top body section 24. Furthermore, a third airflow portion 25-3 passes around the left and right sides 20, 22. The airflow portions 25-1, 25-2, and 25-3 rejoin behind the rear end 18 in a wake area or recirculating airflow region 25-5 immediately behind the rear end 18 of the moving vehicle. The recirculating airflow region 25-5 is generally caused at elevated vehicle speeds by the flow of surrounding air around the body sides 18, 20, 22, 24, and 26.

Figure 3:
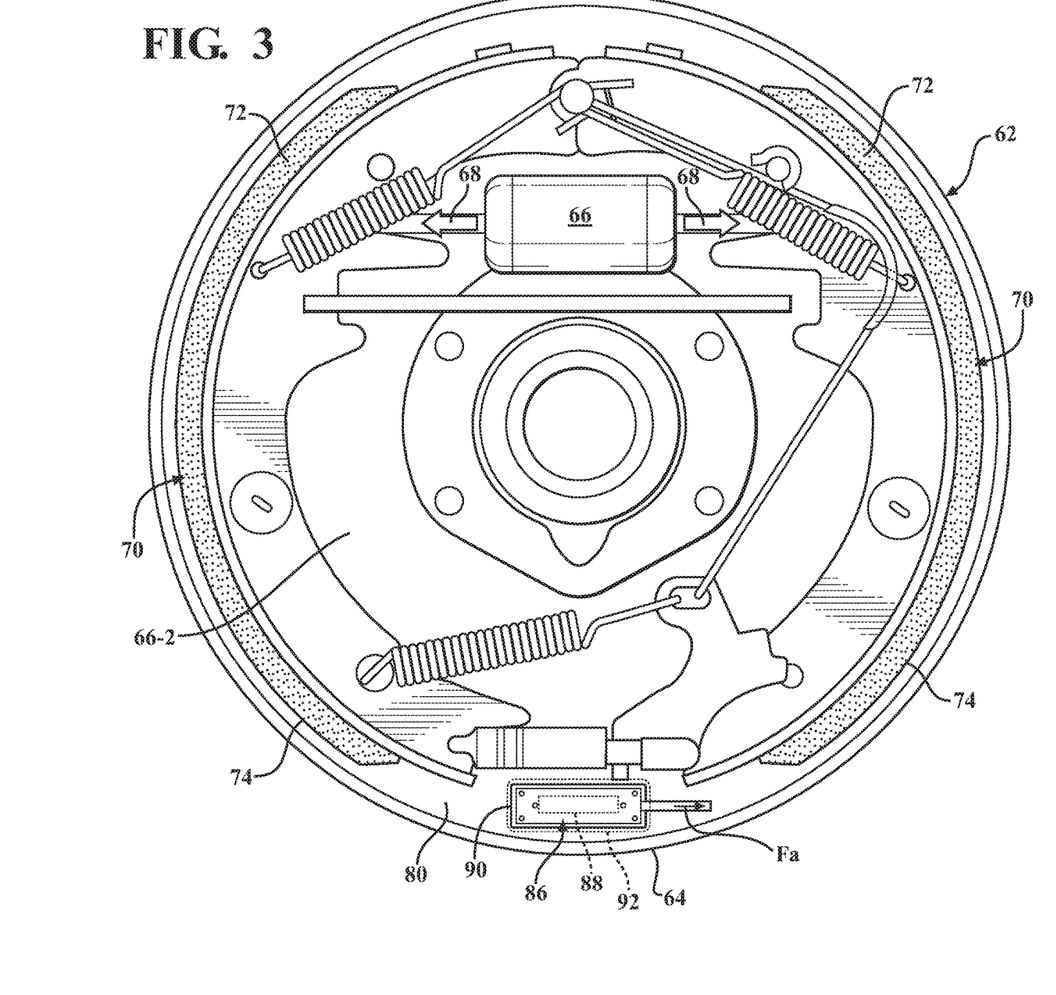
FIG. 3 is a schematic side view of a drum brake embodiment of the brake subassembly shown in FIG. 1, wherein the actuator is mounted to a drum brake shield assembly.

With reference to FIGS. 1 and 3, the vehicle 10 includes a plurality of road wheels, specifically front wheels 32A and rear wheels 32B, and a powertrain 34 that may include an internal combustion engine 36 for generating engine torque T. The powertrain 34 may also include a transmission 38 operatively connecting the engine 36 to at least some of the road wheels 32A, 32B for transmitting engine torque T thereto. The powertrain 34 may additionally include a fuel cell and/or one or more electric motor-generators (not shown) operatively connected to at least some of the road wheels 32A and 32B.

As shown in FIG. 1, a vehicle suspension system 40 operatively connects the body 14 to the respective road wheels 32A and 32B for maintaining contact between the wheels and a road surface, and for maintaining handling of the vehicle. The suspension system 40 may include an upper control arm 42, a lower control arm 44, and a strut 46 connected to each of the front wheels 32A, 32B. The suspension system 40 may also include a trailing arm 48 and a spring 50 connected to each of the rear wheels 32A, 32B. Although a specific configuration of the suspension system 40 is shown in FIG. 1, other vehicle suspension designs are similarly envisioned.

As also shown in FIG. 1, a vehicle steering system 52 is operatively connected to the front wheels 32A for steering the vehicle 10. The steering system 52 includes a steering wheel 54 that is operatively connected to the front wheels 32A via a steering rack 56. The steering wheel 54 is arranged inside the passenger compartment of the vehicle 10, such that an operator of the vehicle may command the vehicle to assume a particular direction with respect to the road surface. Additionally, an accelerator pedal 58 is positioned inside the passenger compartment of the vehicle 10, wherein the accelerator pedal is operatively connected to the powertrain 34 for commanding propulsion of the vehicle 10.

A vehicle braking system 60 is operatively connected to the respective front and rear wheels 32A, 32B for retarding rotation of the wheels and decelerating the vehicle 10. The braking system 60 includes a friction brake subassembly 62 arranged at each of the respective front and rear wheels 32A, 32B and operatively connected to the vehicle suspension system 40. Each brake subassembly 62 may be configured as either a disc brake (shown in FIG. 2) or a drum brake (shown in FIG. 3). Each brake subassembly 62 includes a rotor 64 configured for synchronous rotation with the respective wheel 32A or 32B about an axis Y. Rotor material is generally selected for advantageous friction and wear characteristics, as well as effective heat resistance. Typically, rotors are formed out of cast iron, but may in some cases be made of composites such as reinforced carbon-carbon or ceramic matrix composites. Each brake subassembly 62 additionally includes an actuator 66, such as a hydraulically activated piston arranged in a brake caliper 66-1 of a disc brake (shown in FIG. 2) or in a foundation 66-2 of a drum brake (shown in FIG. 3), and configured to generate an actuator force 68.

Figure 2:
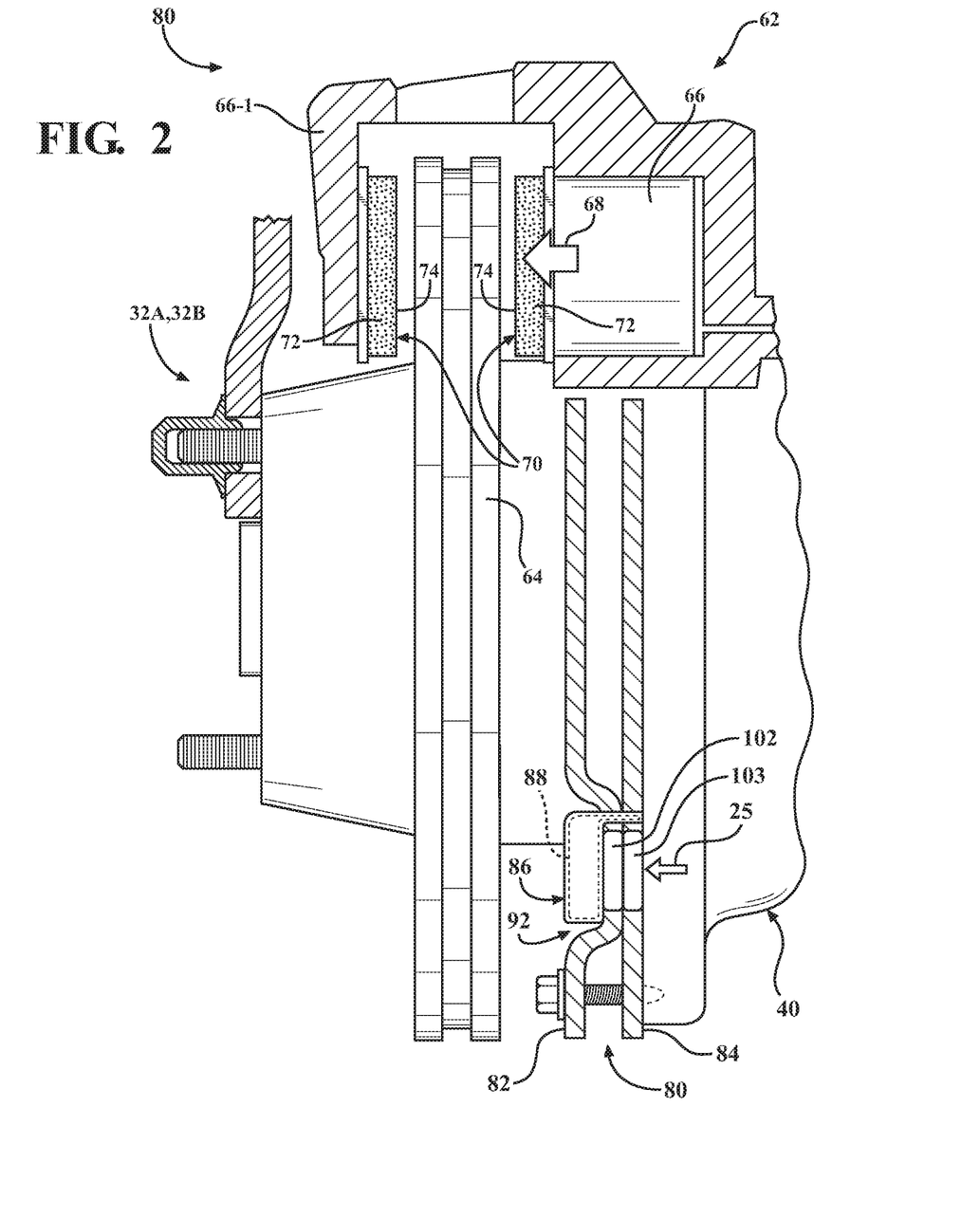
FIG. 2 is a schematic cross-sectional view of a disc brake embodiment of the brake subassembly shown in FIG. 1, wherein the brake subassembly is configured as a disc brake and the actuator is mounted to a disc brake shield assembly.

As shown in FIGS. 2 and 3, each brake subassembly 62 also includes a brake component 70 having a wearable friction lining or segment 72. The friction segment 72 additionally includes a friction surface 74 that becomes pressed into contact with the rotor 64 by the actuator force 68 for retarding rotation of the respective wheel 32A or 32B. Typically, friction segments are composed of relatively soft but tough and heat-resistant materials having a high coefficient of dynamic friction, and, ideally an identical coefficient of static friction. The friction segment 72 is the portion of the brake subassembly 62 which converts the vehicle's kinetic energy into thermal energy that is intially largely absorbed by the rotor 64 and subsequently given off via radiation and/or convection to the ambient. Such absorption of thermal energy may cause excessive wear on the friction segment 72 and the rotor 64, thermally induced dimensional distortion of the rotor, and brake fade, i.e., a decrease in the brake's stopping power.

The complete brake component 70 (including the friction segment 72) is typically called a "brake pad" or "brake shoe". As shown in FIG. 2, if the brake subassembly 62 is configured as a disc brake, the rotor 64 is configured as a disc rotor and the brake component 70 is correspondingly configured as a disc brake pad. As shown in FIG. 3, if the brake subassembly 62 is configured as a drum brake, the rotor 64 is configured as a brake drum and the brake component 70 is correspondingly configured as a drum brake shoe.

As shown in FIG. 2, in a disc brake, the caliper 66-1 is generally configured to hold a pair of braking components 70, i.e., brake pads, relative to the rotor 64, i.e., disc rotor, and apply the actuator force 68 to the brake pads in order to squeeze the disc rotor for decelerating the vehicle 10. As shown in FIG. 3, in a drum brake, a pair of brake components 70, i.e., brake shoes, are generally held inside the rotor 64, i.e., drum, and the actuator 66 applies the actuator force 68 to press the brake shoes against a perimeter of the inner surface of the drum to decelerate the vehicle 10. Additionally, in each case, of disc and drum brakes of FIGS. 2 and 3, respectively, the actuator force 68 may be controlled via a brake pedal 76 (shown in FIG. 1). The brake pedal 76 is positioned inside the passenger compartment of the vehicle 10, and is adapted to be controlled by the operator of the vehicle. Alternatively, the actuator force 68 may be controlled via an onboard or an external computer (not shown).

As shown in FIGS. 2-10B, the vehicle 10 also includes an articulated brake shield assembly 80 mounted to an appropriate component of a specific embodiment of the vehicle suspension system 40, and arranged proximate, such as within 2-10 mm, to the rotor 64. The articulated brake rotor shield assembly 80 may be configured as a shield for the disc rotor embodiment of the rotor 64 (as shown in FIGS. 2 and 3). The articulated brake shield assembly 80 is generally configured to protect the rotor 64 from various road-borne debris, and protect nearby components from heat energy radiated by the rotor. As shown in FIG. 3, the articulated brake shield assembly 80 may also be configured as a backing plate for the brake drum embodiment of the rotor 64, which, in part, serves a similar shielding function. The articulated brake shield assembly 80 is additionally configured to open a path for at least a portion of the incident ambient airflow 25, for example, the underbody airflow portion 25-1 or the third airflow portion 25-3, to the friction brake subassembly 62 and control temperature thereof.

As shown in FIGS. 2 and 4-10B, the shield assembly 80 includes a first shield component 82. The first shield component 82 is arranged proximate the friction brake subassembly 62. The first shield component 82 is positioned generally parallel to the rotor 64 and is rotationally fixed relative to the vehicle body 14. The shield assembly 80 also includes a second shield component 84 operatively connected to the first shield component 82 and configured to shift relative thereto. Specifically, the second shield component 84 may nominally be arranged in the near proximity to, such as within fractions of a millimeter or even contacting, the first shield component 82, and generally parallel thereto. The shield assembly 80 additionally includes an actuator 86 employing a shape memory alloy (SMA) element, generally indicated via a numeral 88 in FIG. 2, to generate a force $F_a$ which is used to shift the second shield component 84 relative to the first shield component 82.

The actuator 86 is arranged at the brake subassembly 62 and configured to select a position for the second shield component 84 between and inclusive of fully-closed (shown in FIGS. 6A, 7A, 8A, 9A, and 10A) and fully-opened (shown in FIGS. 6B, 7B, 8B, 9B, and 10B) in response to a temperature of the brake subassembly 62. Such operation of the shield assembly 80 is intended to direct at least a portion of the incident ambient airflow 25 via opening a path for the airflow to the friction brake subassembly 62, for example to the rotor 64, and control temperature thereof. Specifically, the actuator 86 may be configured to selectively operate the shield assembly 80 via the force $F_a$ (shown in FIGS. 6B, 7B, 8B, 9B, and 10B) shifting the second shield component 84, between and inclusive of a fully-opened and fully-closed shield assembly, in response to a specifically selected, i.e., preset, temperature of the friction brake subassembly 62, as detected by the SMA element 88.

The SMA element 88 is intended to be constructed from a phase-change material, such as copper-aluminum-nickel, nickel-titanium, or nickel-titanium-copper. Typically, an SMA, also known as smart metal or alloy, is an alloy that "remembers" its original shape and, after being deformed, returns to its pre-deformed shape when heated. As employed herein, a "phase-change" material is the type that may exist in different phases—having different microstructural and functional properties at different temperatures—and is able to transform from one phase to the other as a result of a change in temperature and stress affecting the material.

An SMA may exhibit a shape memory effect. That is, the SMA element 88 may undergo a solid state, crystallographic phase change via a shift between a martensite phase, i.e., "martensite", and an austenite phase, i.e., "austenite." The martensite phase is a relatively soft and easily deformable phase of the shape memory alloys, which generally exists at lower temperatures. The austenite phase, the stronger phase of shape memory alloys, occurs at higher temperatures. The temperature at which a shape memory alloy remembers its high temperature form, referred to as the phase transformation temperature, can be adjusted by applying stress and other methods. Accordingly, a temperature difference between the austenite phase and the martensite phase may be the phase transformation delta T. Alternatively stated, the SMA element 88 may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable—i.e., Young's modulus is approximately 2.5 times lower—than the comparatively higher-temperature austenite phase.

The temperature at which the SMA element 88 begins to change from the austenite phase to the martensite phase is known as the martensite start temperature, $M_S$. The temperature at which the SMA element 88 completes the change from the austenite phase to the martensite phase is known as the martensite finish temperature, $M_F$. Similarly, as the SMA element 88 is heated, the temperature at which the SMA element 88 begins to change from the martensite phase to the austenite phase is known as the austenite start temperature, $A_S$. The temperature at which the SMA element 88 completes the change from the martensite phase to the austenite phase is known as the austenite finish temperature, $A_F$. Therefore, the SMA element 88 may be characterized by a cold state, i.e., when a temperature of the SMA element is below the martensite finish temperature $M_F$ of the SMA element 88. Likewise, the SMA element 88 may also be characterized by a hot state, i.e., when the temperature of the SMA element 88 is above the austenite finish temperature $A_F$ of the SMA element.

Accordingly, the SMA element 88 is configured to transform from one phase to the other as a result of the change in temperature and stress affecting the element. Thus the SMA element 88 provides the actuator 86 with capability to sense temperature of the friction brake subassembly 62 and operate in response thereto. Accordingly, the characteristics of the SMA element 88 may be specifically selected to generate the force $F_a$ at the preset temperature of the friction brake subassembly 62.

Figure 4:
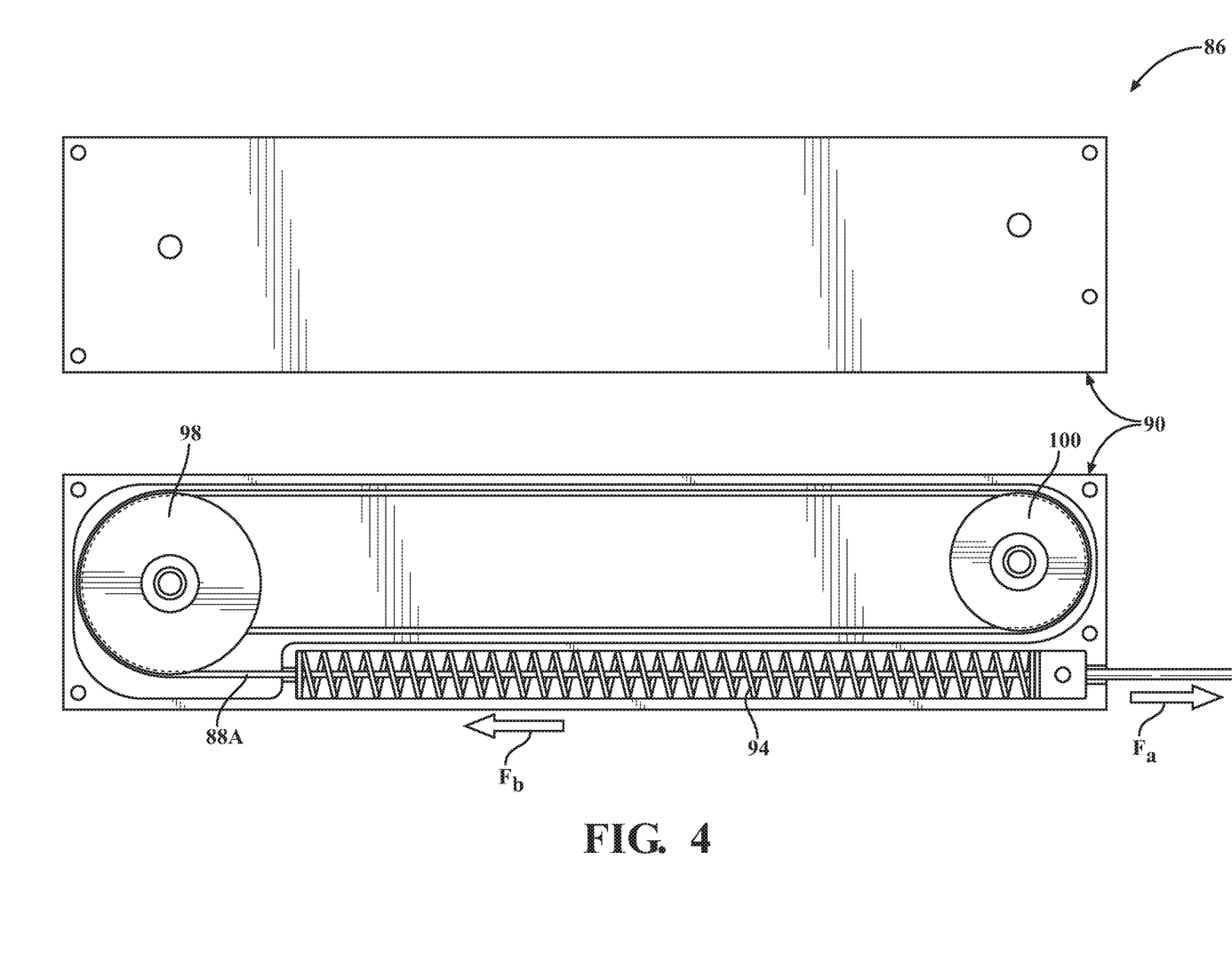
FIG. 4 is a schematic close-up partially disassembled illustration of internal components of an embodiment of the actuator shown in FIGS. 1-3.
Figure 5:
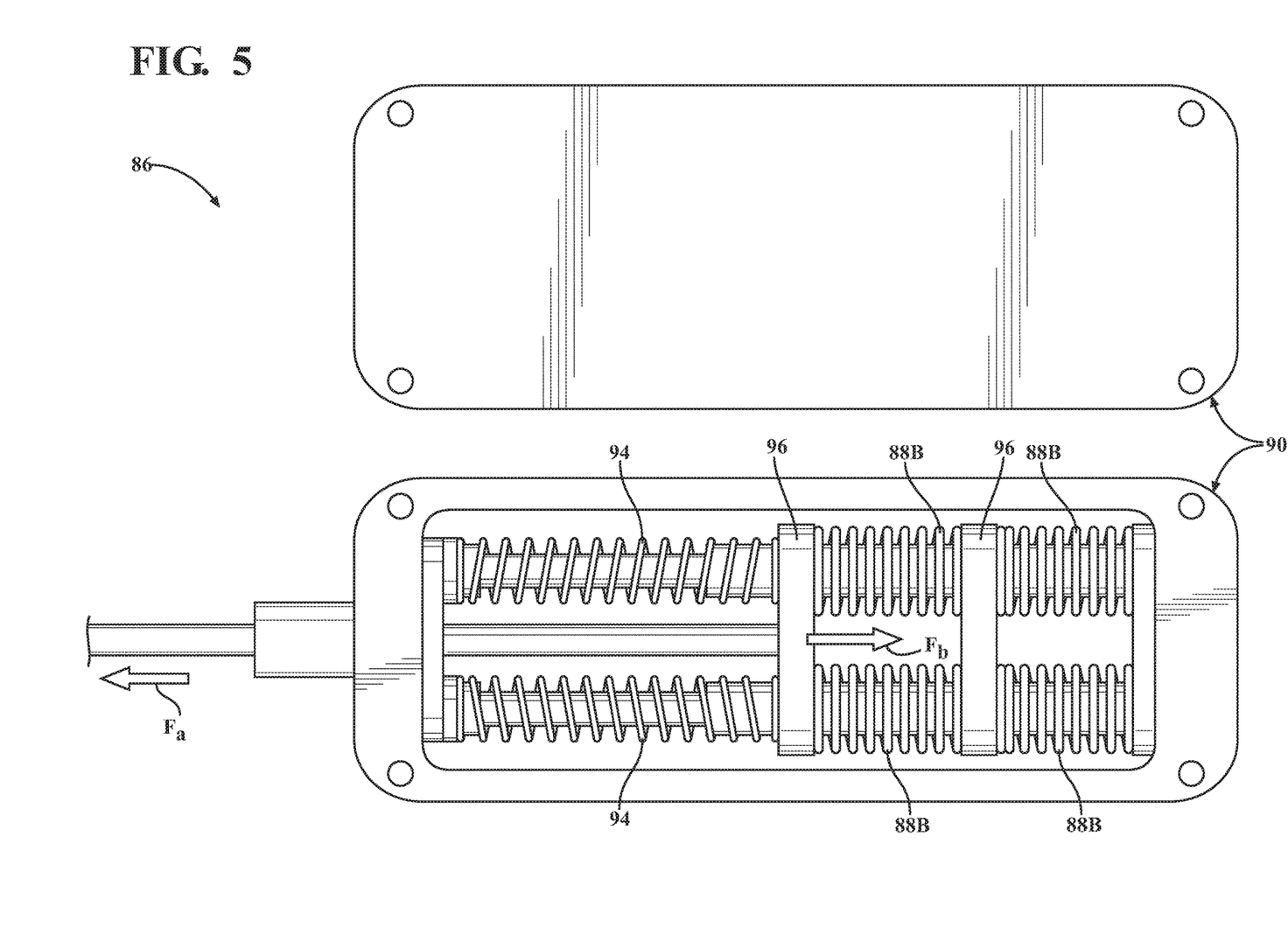
FIG. 5 is a schematic close-up partially disassembled illustration of internal components of another embodiment of the actuator shown in FIGS. 1-3.

As shown in FIGS. 2-5, the actuator 86 may be enclosed in an actuator housing 90. The actuator 86 may be mounted directly to the first shield component 82. To facilitate such construction of the shield assembly 80, the first shield component 82 may define a pocket or an aperture 92 having dimensions specifically selected to accept and accommodate outer dimensions of the actuator housing 90. Such mounting of the actuator 86 at the first shield component 82 assures that the SMA element 88 responds to the heat energy given off by the rotor 64 and/or the pads 70 to activate the shield assembly 80 and open a path for the incident ambient airflow 25 to cool the friction brake subassembly 62. In some embodiments of the shield assembly 80, such as shown in FIGS. 4 and 5, the actuator 86 additionally includes a bias spring 94 configured to counter the force $F_a$ generated by the SMA element 88. Specifically, the spring 94 generates a force $F_b$ to retract the second shield component 84 below the preset temperature of the friction brake subassembly 62.

In the specific FIG. 4 embodiment of the actuator 86, the bias force $F_b$ of the bias spring 94 may be configured to counter one of expansion and contraction of a wire embodiment 88A of the SMA element 88. In an alternative embodiment shown in FIG. 5, the SMA 88 may be configured as a plurality of wire coils 88B, which could be separated by individual dividers 96 and arranged in series with one or more bias springs 94. The actuator 86 employing the wire 88A embodiment of the SMA 88 may also include a first pulley 98 and a second pulley 100 (shown in FIG. 4). As shown, the wire 88A embodiment of the SMA 88 extends around the pulleys 98, 100. In such an embodiment, each of the first and the second pulleys 98, 100 is configured to change a directional path of the SMA 88 wire, such that the actuator 86 may exert the force $F_a$ to actuate the second shield component 84. Furthermore, the pulleys 98, 100 permit a dimensionally compact packaging of the actuator 86 employing the wire 88A embodiment of the SMA 88 having sufficient length to generate appropriate displacement and actuation of the second shield component 84. Accordingly, the force $F_a$ operates opposite the bias force $F_b$ exerted by the bias spring 94. In the specific embodiment shown in FIG. 4, actuator housing 90 is configured to mount and retain the SMA 88, the bias spring 94, and the pulleys 98, 100 therein.

Figure 6A:
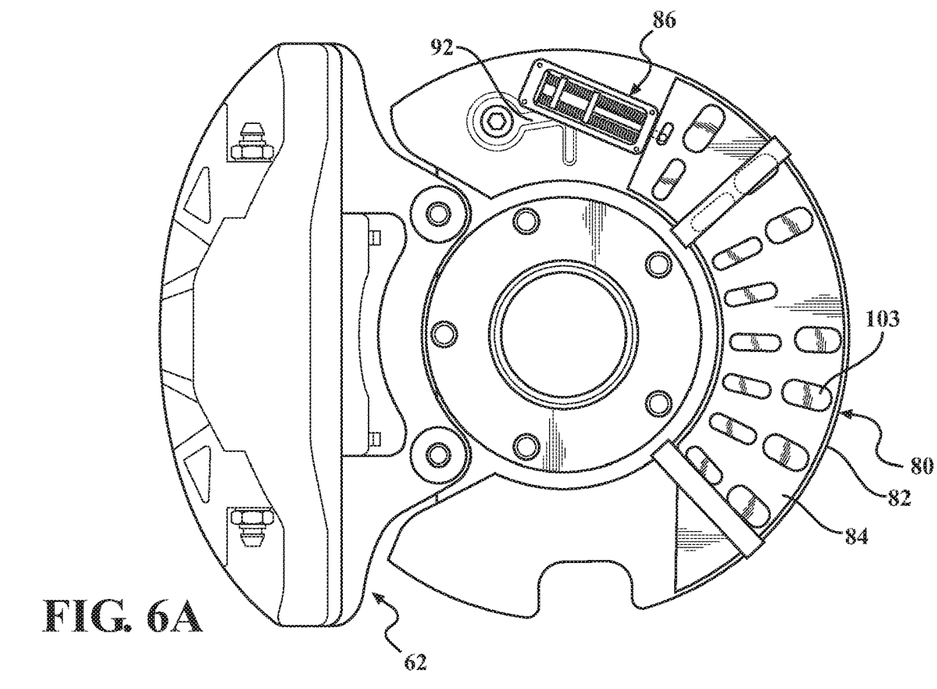
FIG. 6A is a schematic close-up illustration of an embodiment of the articulated shield assembly shown in FIGS. 1-3; wherein the shield is depicted in a fully-closed state.
Figure 6B:
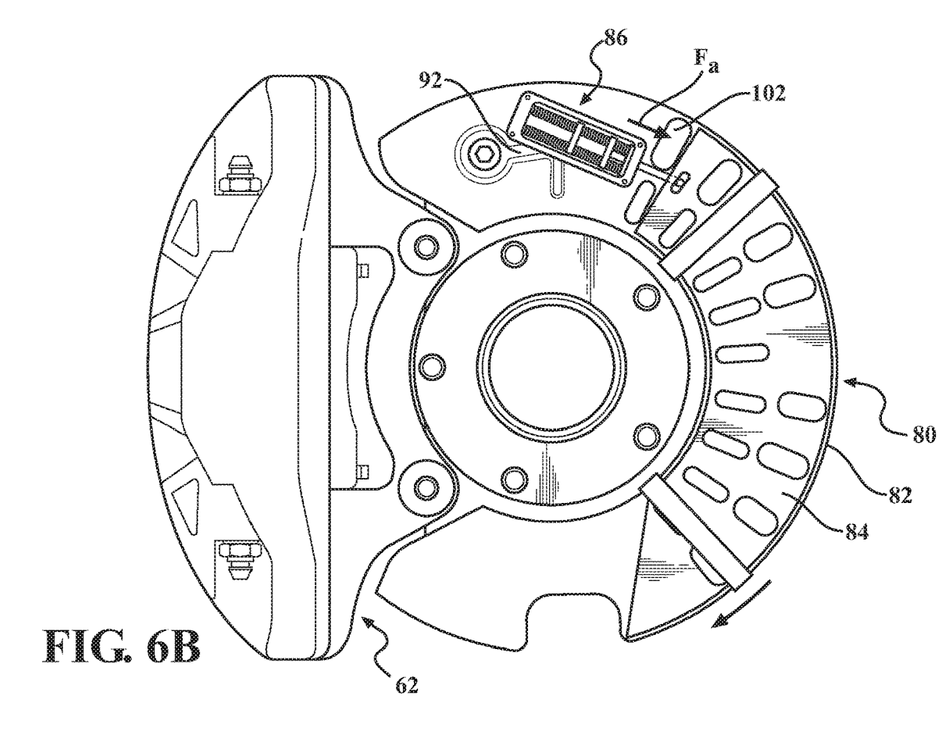
FIG. 6B is a schematic close-up illustration of the embodiment of the articulated shield assembly shown in FIG. 6A; wherein the shield is depicted in a fully-opened state.

According to an embodiment shown in FIGS. 6A and 6B, the first shield component 82 may define one or more openings 102, while the second shield component 84 may define at least one opening 103. The opening(s) 103 are configured to admit at least a portion of the incident ambient airflow 25 to the friction brake subassembly 62 when the opening(s) 103 coincide with the opening(s) 102. Specifically, in the embodiment of FIGS. 6A and 6B the second shield component 84 is configured to rotate about the axis Y relative to the first shield component 82 to thereby selectively block and unblock the opening(s) 102. Accordingly, the opening(s) 103 are arranged to coincide with the opening(s) 102 and admit the incident ambient airflow 25 to the friction brake subassembly 62 when the second shield component 84 has been rotated an appropriate amount via the SMA 88. In such an embodiment, the actuator 86 may be arranged directly on the first shield component 82, as described above with respect to FIG. 2.

Figure 7A:
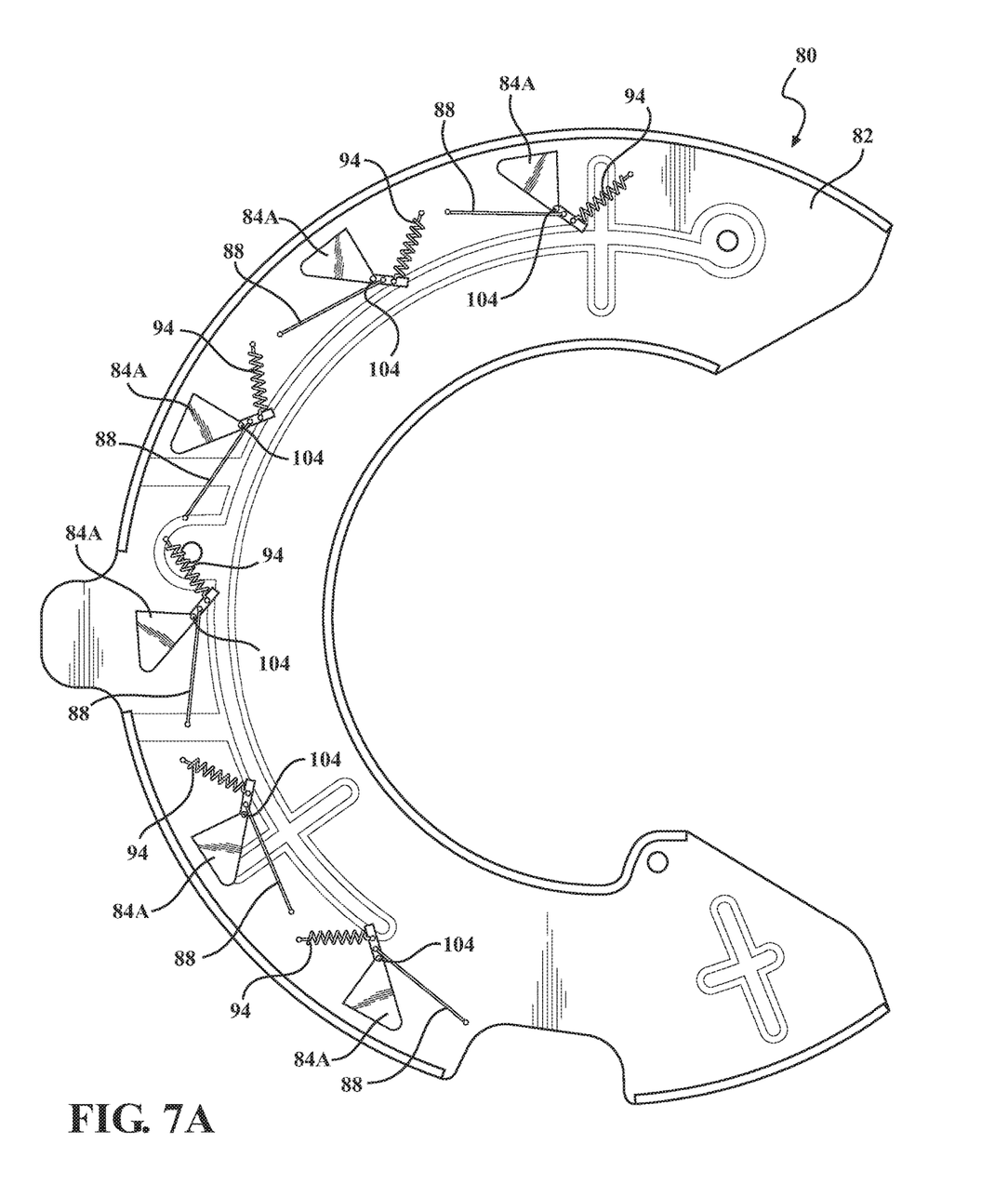
FIG. 7A is a schematic close-up illustration of another embodiment of the articulated shield assembly shown in FIGS. 1-3; wherein the shield is depicted in a fully-closed state.
Figure 7B:
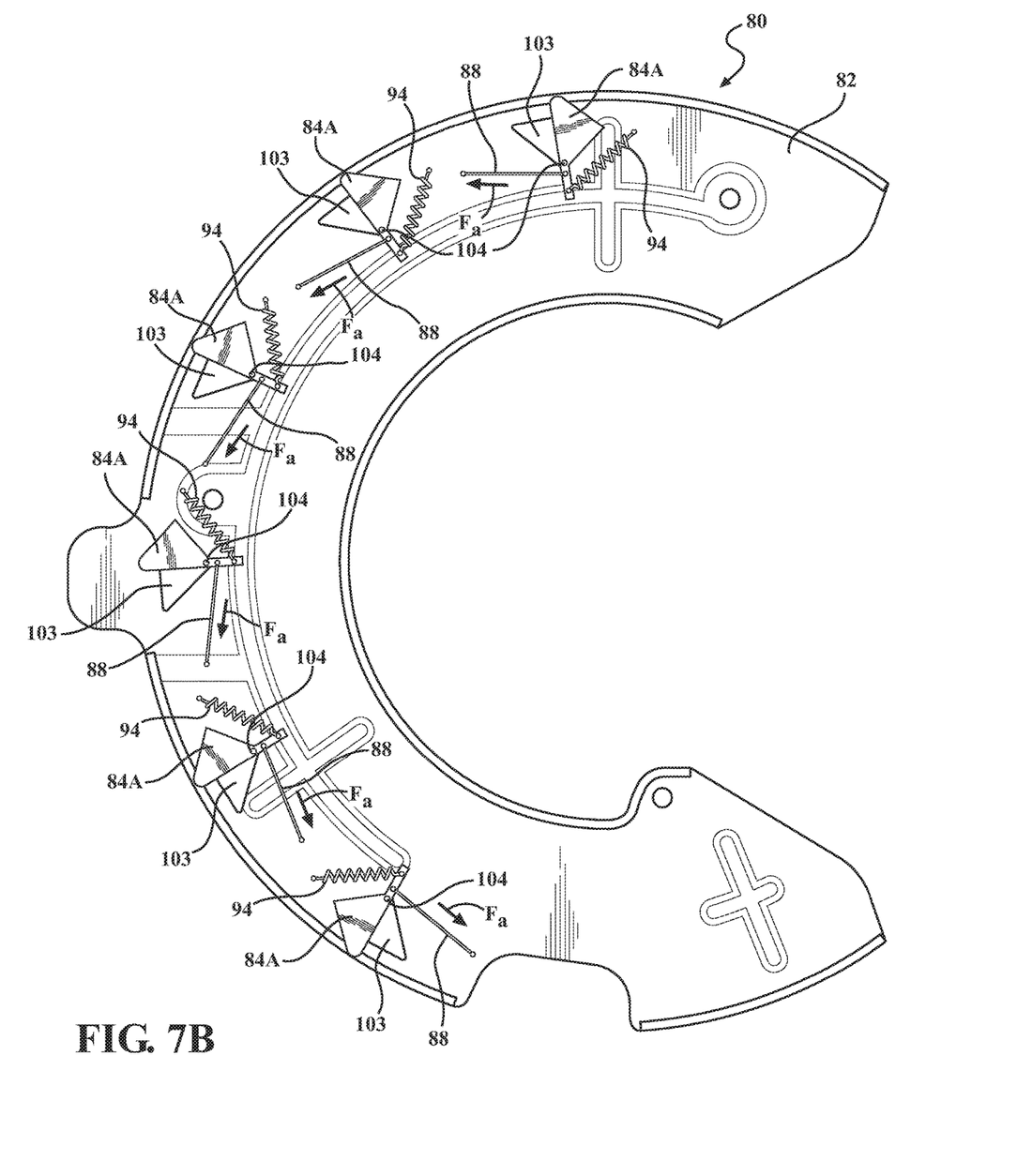
FIG. 7B is a schematic close-up illustration of the embodiment of the articulated shield assembly shown in FIG. 7A; wherein the shield is depicted in a fully-opened state.

According to another embodiment shown in FIGS. 7A and 7B, the first shield component 82 may define a plurality of individual openings 102. Additionally, the SMA element 88 is configured as a plurality of individual SMA wires 88A. The spring 94 may then be configured as a plurality of individual springs 94A. The first shield component 82 may also include a plurality of pivot members 104. Furthermore, the second shield component 84 may then include, or, more specifically, be configured as a plurality of individual flaps or tabs 84A. In the subject embodiment, each individual SMA wire 88A is then configured to rotate at least one of the plurality of individual flaps 84A about a respective one of the plurality of pivot members 104, and thereby selectively block and unblock a respective one of the plurality of individual openings 102.

Figure 8A:
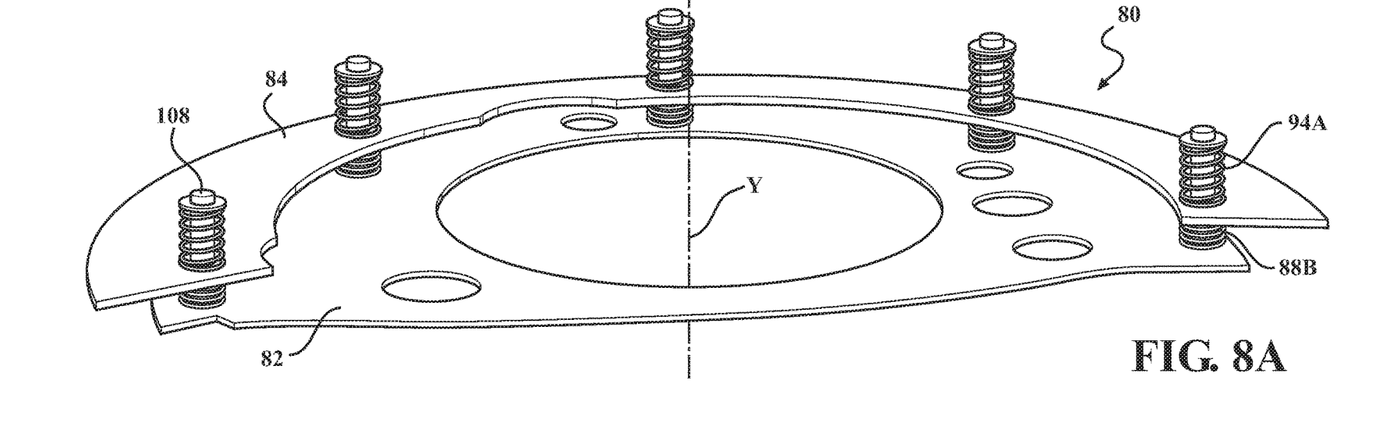
FIG. 8A is a schematic close-up illustration of another embodiment of the articulated shield assembly shown in FIGS. 1-3; wherein the shield is depicted in a fully-closed state.
Figure 8B:
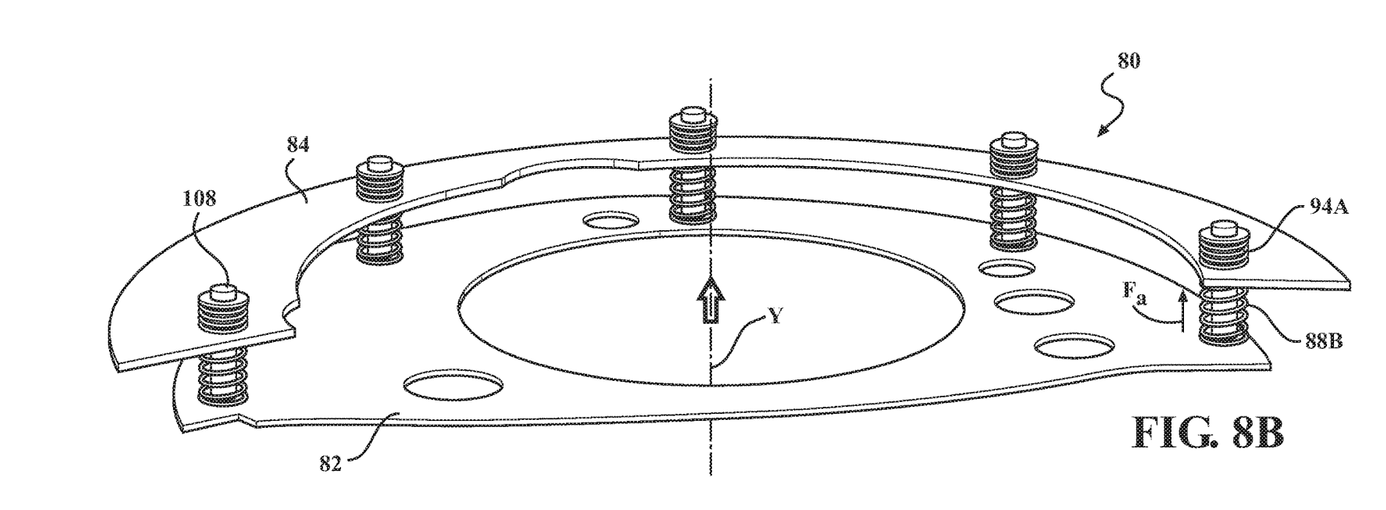
FIG. 8B is a schematic close-up illustration of the embodiment of the articulated shield assembly shown in FIG. 8A; wherein the shield is depicted in a fully-opened state.

According to another embodiment shown in FIGS. 8A, 8B, the second shield component 84 may be arranged parallel to and proximate, for example in contact with, the first shield component 82. The second shield component 84 may be configured to selectively space apart or shift away along the axis Y from the first shield component 82 to thereby generate a path for at least a portion of the incident ambient airflow 25 to the friction brake subassembly 62. The shield assembly 80 may further include one or more guide pins 108 configured to maintain rotational position of the second shield component 84 relative to the first shield component 82. As shown, the SMA element 88 is configured as a plurality of individual SMA helical elements 88B. Each SMA helical element 88B and individual spring 94A may be arranged concentrically around the respective guide pin 108.

Figure 9A:
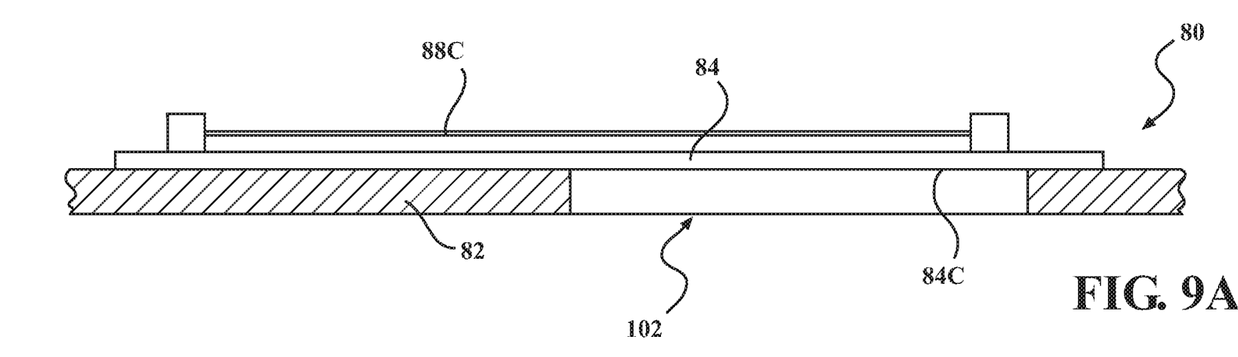
FIG. 9A is a schematic close-up illustration of another embodiment of the articulated shield assembly shown in FIGS. 1-3; wherein the shield is depicted in a fully-closed state.
Figure 9B:
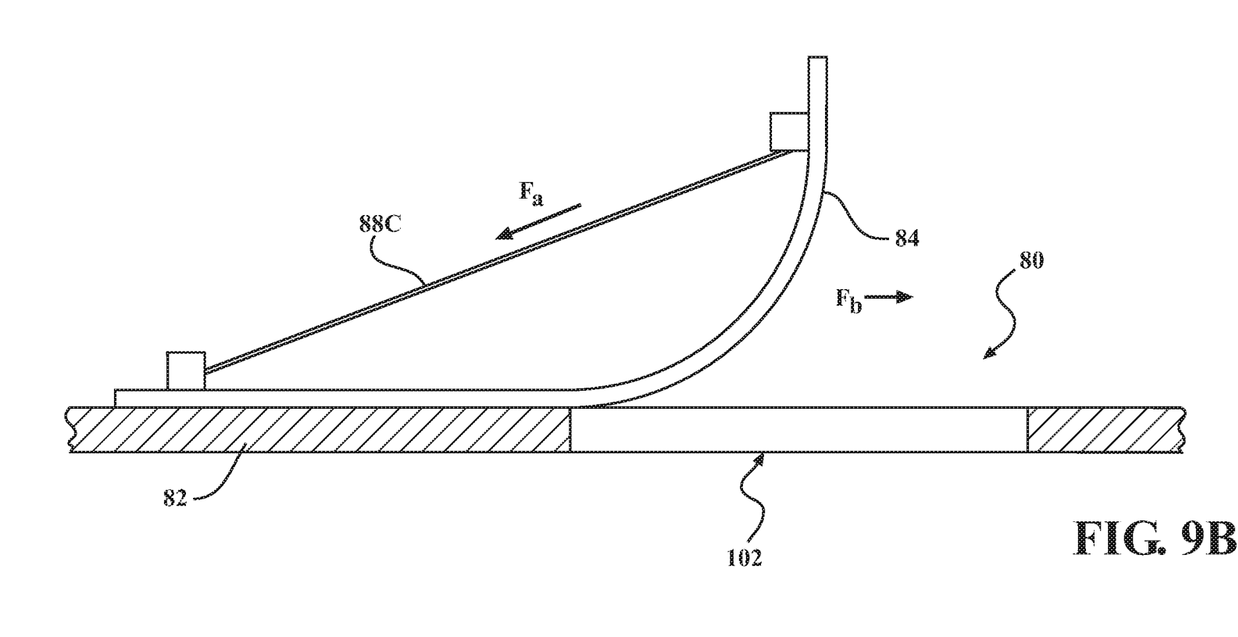
FIG. 9B is a schematic close-up illustration of the embodiment of the articulated shield assembly shown in FIG. 9A; wherein the shield is depicted in a fully-opened state.
Figure 10A:
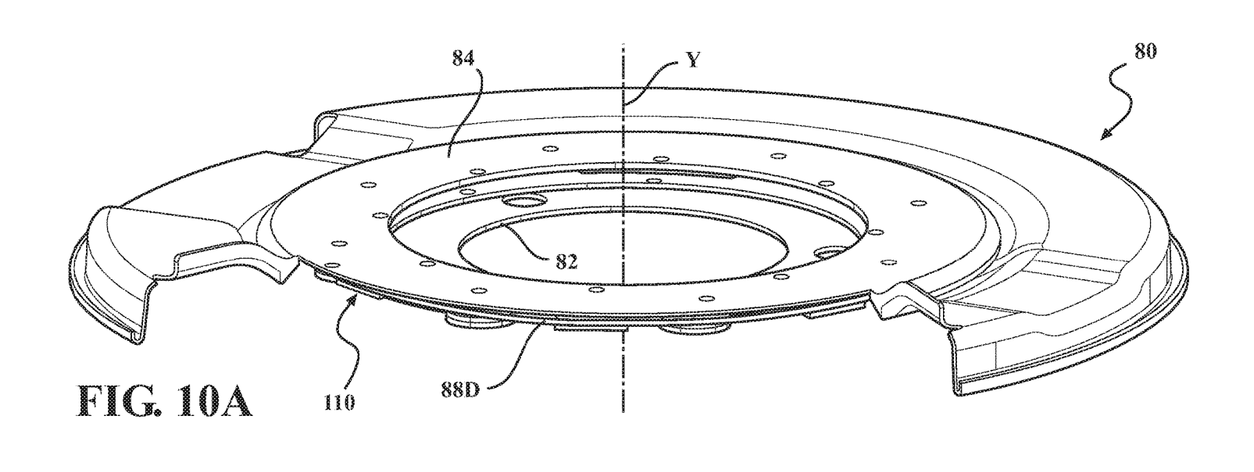
FIG. 10A is a schematic close-up illustration of another embodiment of the articulated shield assembly shown in FIGS. 1-3; wherein the shield is depicted in a fully-closed state.
Figure 10B:
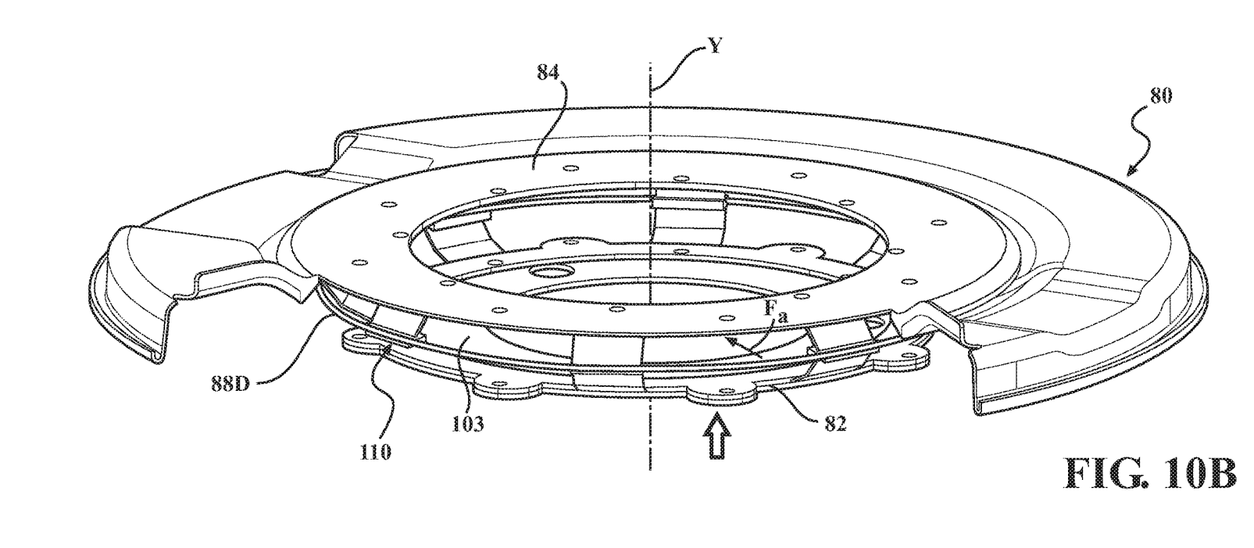
FIG. 10B is a schematic close-up illustration of the embodiment of the articulated shield assembly shown in FIG. 10A; wherein the shield is depicted in a fully-opened state.

According to another embodiment shown in FIGS. 9A, 9B, the first shield component 82 may define a plurality of openings 102 and the second shield component 84 may be constructed as an elastic member 84C. As shown, each elastic member 84C is configured to selectively cover and uncover a respective opening 102 and generate a return or bias force $F_b$ when flexed. In the present embodiment, a SMA element 88C is configured to flex the respective elastic member 84C and thereby uncover the particular opening 102. Accordingly, the specific embodiment of FIGS. 9A, 9B may be characterized by an absence of a separate dedicated bias spring(s), such as the spring 94. According to still another embodiment shown in FIGS. 10A, 10B, at least one of the first shield component 82 and the second shield component 84 may include a plurality of elastic members 110. As shown, in the present embodiment the SMA element 88 is constructed as a spiral member 88D that is wound around the plurality of elastic members 110. The spiral SMA element 88 is further configured to selectively squeeze the plurality of elastic members 110 and thereby separate the second shield component 82 from the first shield component 84 in response to the temperature of the brake subassembly 62.

Overall, the articulated brake shield assembly 80 may shield the friction brake subassembly 62 from road borne contaminants and/or debris in its fully- or nearly-closed state. On the other hand, the articulated brake shield assembly 80 has the capability to generate a path for the incident ambient airflow 25 to cool the friction brake subassembly 62 when conditions driving increased brake temperatures so require. Accordingly, the common compromise of efficient brake cooling for maintenance of peak stopping power and extended friction lining 72 life at the expense of introducing possible contamination into the friction brake subassembly 62, between the rotor 64 and the friction surface 74, may be avoided.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An articulated shield assembly for a friction brake configured to decelerate a road wheel of a vehicle having a vehicle body with a first vehicle body end configured to face an incident ambient airflow, a second vehicle body end opposite of the first vehicle body end, and a vehicle underbody section configured to span a distance between the first and second vehicle body ends, the shield assembly comprising:
   a first shield component arranged proximate the friction brake and rotationally fixed relative to the vehicle body;
   a second shield component operatively connected to the first shield component and configured to shift relative to the first shield component; and
   an actuator employing a shape memory alloy (SMA) element to shift the second shield component relative to the first shield component in response to a temperature of the friction brake to thereby direct at least a portion of the incident ambient airflow to the friction brake and control temperature thereof;
   wherein the second shield component is arranged proximate and parallel to the first shield component, and the second shield component is configured to selectively space apart from the first shield component to thereby generate a path for the at least a portion of the incident ambient airflow to the friction brake.

2. The shield assembly according to claim 1, wherein the actuator additionally includes a spring configured to counter a force generated by the SMA element and retract the second shield component below a preset temperature of the friction brake.

3. The shield assembly according to claim 2, wherein each of the SMA element and the spring is arranged concentrically around a guide pin.

4. The shield assembly according to claim 1, further comprising a guide pin configured to maintain rotational position of the second shield component relative to the first shield component.

5. A vehicle comprising:
   a vehicle body including a first vehicle body end configured to face an incident ambient airflow, a second vehicle body end opposite of the first vehicle body end, and a vehicle underbody section configured to span a distance between the first and second vehicle body ends;
   a road wheel operatively connected to the vehicle body;
   a friction brake configured to retard rotation of the road wheel and thereby decelerate the vehicle; and
   an articulated shield assembly comprising:
     a first shield component arranged proximate the friction brake and rotationally fixed relative to the vehicle body;
     a second shield component operatively connected to the first shield component and configured to shift relative to the first shield component; and
     an actuator employing a shape memory alloy (SMA) element to shift the second shield component relative to the first shield component in response to a temperature of the friction brake to thereby direct at least a portion of the incident ambient airflow to the friction brake and control temperature thereof;
     wherein the second shield component is arranged proximate and parallel to the first shield component, and the second shield component is configured to selectively space apart from the first shield component to thereby generate a path for the at least a portion of the incident ambient airflow to the friction brake.

6. The vehicle according to claim 5, wherein the actuator additionally includes a spring configured to counter a force generated by the SMA element and retract the second shield component below a preset temperature of the friction brake.

7. The vehicle according to claim 6, wherein each of the SMA element and the spring is arranged concentrically around a guide pin.

8. The vehicle according to claim 5, wherein the shield assembly additionally includes a guide pin configured to maintain rotational position of the second shield component relative to the first shield component.

* * * * *